Figure 1:
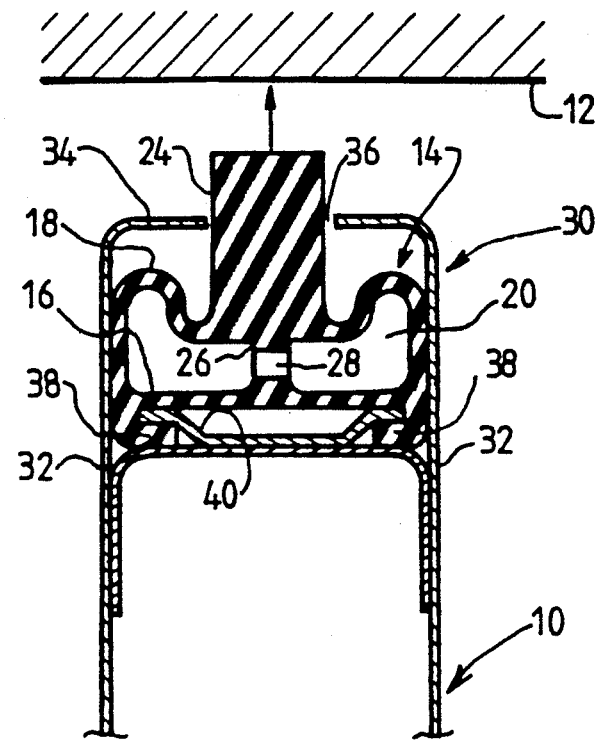

United States Patent [19]

Colin

[11] Patent Number: 5,209,498
[45] Date of Patent: May 11, 1993

[54] INFLATABLE GASKET SEALING DEVICE FOR A DOOR OR A MOVING PANEL

[75] Inventor: Olivier Colin, Argenteuil, France

[73] Assignee: Le Joint Francais, Paris, France

[21] Appl. No.: 838,416

[22] PCT Filed: Jul. 10, 1991

[86] PCT No.: PCT/FR91/00556

§ 371 Date: Mar. 19, 1992

§ 102(e) Date: Mar. 19, 1992

[87] PCT Pub. No.: WO92/01179

PCT Pub. Date: Jan. 23, 1992

[30] Foreign Application Priority Data

Jul. 10, 1990 [FR] France ................ 90 08726

[51] Int. Cl.$^5$ ............................................. F16J 15/46
[52] U.S. Cl. .................................... 277/34; 277/182; 49/477.1
[58] Field of Search ................. 277/34, 34.3, 34.6, 277/182; 49/477

[56] References Cited

U.S. PATENT DOCUMENTS

| | | | |
|---|---|---|---|
| 2,720,011 | 10/1955 | Krupp | 277/34 |
| 3,040,393 | 6/1962 | Dailey | 277/34 |
| 3,161,229 | 12/1964 | Sanders | 277/34 |
| 3,178,779 | 4/1965 | Clark et al. | 277/34 |
| 4,342,336 | 8/1982 | Satterthwaite | 277/34 |
| 4,399,317 | 8/1983 | VanDyk, Jr. | 277/34 |
| 4,624,465 | 11/1986 | Rogemont | 277/34 |
| 4,961,599 | 10/1990 | Delery, Jr. et al. | 277/182 |

FOREIGN PATENT DOCUMENTS

| | | | |
|---|---|---|---|
| 0237770 | 9/1987 | European Pat. Off. | 277/34 |
| 7507105 | 7/1975 | Fed. Rep. of Germany . | |
| 8805402 | 7/1988 | Fed. Rep. of Germany . | |
| 1310018 | 10/1962 | France . | |
| 2267499 | 11/1975 | France . | |
| 2338372 | 8/1977 | France . | |

OTHER PUBLICATIONS

Bauwirtschaft, No. 5, Jan. 27, 1972, p. 143, article "LB-Dichtungssystem" (LB-sealing system).

Primary Examiner—William A. Cuchlinski, Jr.
Assistant Examiner—Daniel G. DePumpo
Attorney, Agent, or Firm—Bell, Seltzer, Park & Gibson

[57] ABSTRACT

An inflatable gasket sealing device for a door or a moving panel comprises an inflatable sealing gasket (14) fixed on the periphery of the door or the panel (10) and protected by a cover (30, 32) that includes a slot (36) through which a shoe (24) carried by the gasket passes, which shoe is intended to press against a fixed surface (12) when the gasket is inflated, a longitudinal internal partition (26) of the gasket forming return means for returning the shoe (24) to its rest position. The device is applicable, in particular, to the sliding or swing doors of railway cars.

4 Claims, 1 Drawing Sheet

INFLATABLE GASKET SEALING DEVICE FOR A DOOR OR A MOVING PANEL

The invention relates to an inflatable gasket sealing device for a door or a moving panel, such as a door for a railway car, a sliding door or a swing door, a glazed panel, etc.

Inflatable gaskets of this type are generally fixed on the periphery of the door or the panel and they comprise a sealing lip which may or may not be inflatable secured to the inflatable tubular portion of the gasket, and serving to press against a fixed surface relative to which the door or panel is movable.

The inflatable tubular portions of such gaskets are accessible, at least in part, from the outside, and this gives rise to the risk of the gasket being damaged, which gasket may also be subjected to acts of vandalism in which attempts are made to cut or puncture them by means of a sharp object or to tear them off the doors or panels on which they are mounted.

In an attempt to protect such gaskets and to make them less vulnerable to acts of vandalism, proposals have already been made to incorporate reinforcing cloth therein to increase their resistance to puncturing and to tearing. However, this also gives rise to a relatively large increase in the cost of such gaskets.

Proposals have also been made to cover and protect an inflatable gasket by a solid wall which is secured to the door or the panel and which includes a slot through which an independent sealing lip of the inflatable gasket passes and against which the gasket presses when inflated to urge the lip outwards through the slot so as to provide sealing against a fixed surface. However, when the gasket is subsequently deflated, it can also happen that the sealing lip remains jammed to a greater or lesser extent in the slot, given the small amount of clearance that exists between the sealing lip and the edges of the slot, with this impeding subsequent operation of the door or the panel.

An object of the invention is to provide a simple and effective solution to this problem.

An object of the invention is to provide an inflatable gasket sealing device for a door or moving panel in which the inflatable gasket is not demountable and is invulnerable to all kinds of attempts at damaging it.

Another object of the invention is to provide a device of this type which is particularly reliable in operation, providing very good sealing when the gasket is inflated and enabling the door or the moving panel to be moved easily when the gasket is deflated.

Another object of the invention is to provide a device of this type that is not significantly more expensive than an ordinary type of inflatable gasket.

To this end, the invention provides an inflatable gasket sealing device for a door or moving panel, the device comprising an inflatable tubular gasket which is mounted on the door or panel, and a shoe for pressing against a fixed surface relative to which the door or the panel is movable, the inflatable gasket being covered by and protected by a solid wall which is secured to the door or the panel and which includes a longitudinal slot through which the shoe passes, the device being characterized in that the shoe is secured to the inflatable gasket and is connected to a longitudinal internal partition of the inflatable gasket which constitutes return means for returning the shoe to its rest position.

Thus, according to the invention, the inflatable portion of the gasket is no longer accessible from the outside and it is protected against attempts at tearing it or puncturing it. It is therefore possible to use an ordinary type of inflatable gasket that does not include reinforcing cloth.

In addition, the thrust shoe is reliably retracted by the internal longitudinal partition of the inflatable gasket, in spite of any friction that may exist between the thrust shoe and the edges of the slot through which is passes.

In an embodiment of the invention, the above-mentioned gasket is housed inside a cover or a sheath fixed to the periphery of the door or of the panel, and said cover or said sheath includes the above-mentioned slot which is narrower than the inflatable gasket, and which is very slightly wider than the thrust shoe, thereby making the gasket undemountable and protecting it against attempts at tearing it off.

Figure 2:
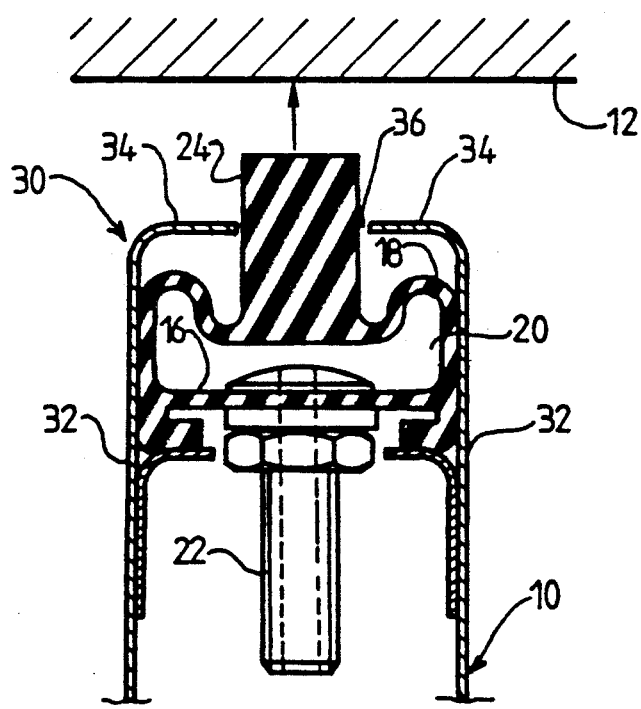

The invention will be better understood and other characteristics, details, and advantages thereof will appear more clearly on reading the following description given by way of example and made with reference to the accompanying drawing, in which:

FIG. 1 is a diagrammatic cross-section view through a sealing device of the invention; and FIG. 2 is a view similar to FIG. 1, showing the same device as FIG. 1, but on a different section plane.

In the embodiment shown in the drawing, reference 10 designates in general a door or panel that is movable relative to a fixed surface or wall 12 and which has an inflatable sealing gasket at its periphery, which gasket is given overall reference 14.

The sealing gasket is continuous and extends over one or more sides of the door or the panel 10, and it comprises a base 16 for mounting on the periphery of the door or the panel, said base 16 having a generally U-shaped cross-section, the gasket further including a resiliently deformable wall 18 connected to the base 16 for delimiting a closed volume 20 which is connected to the outside via an inflation coupling 22 which is shown in FIG. 2 and which is preferably disposed on the inside of the door or the panel 10.

A shoe or rim or like means 24 for thrusting against the above-mentioned fixed surface 12 is carried by the elastically deformable wall 18 and extends continuously outwardly from the gasket, away from the base 16.

In the example shown, the shoe 24 is substantially rectangular in cross-section and it is solid. In variants, it could have different cross-sectional shapes, and it could itself by of the inflatable type.

It will be understood that when a fluid under pressure (generally air) is injected into the volume 20 via the coupling 22, the elastically deformable wall 18 of the gasket takes up an outwardly swollen convex shape and urges the shoe 24 to press against the fixed surface 12. Sealing is thus provided between the door 10 and the fixed surface 12 and the door 10 is held in position because of the pressure with which the shoe 24 is thrust against the surface 12.

When the volume 20 is exhausted, the elastically deformable wall 18 returns to its initial shape as shown in FIGS. 1 and 2, and it moves the shoe 24 away from the surface 12. This return of the elastically deformable wall 18 to its initial or rest position is ensured by at least one internal partition 26, such as that shown in FIG. 1, connecting the elastically deformable wall 18 to the base 26 and including through orifices 28 for passing the inflation fluid.

The inflatable gasket 14 is mounted on the periphery of the door or panel 10 in such a manner as firstly to be undemountable and secondly to be invulnerable to attempts at puncturing it or tearing it.

To do this, the bulk of it is mounted inside a cover or sheath 30 constituted, for example, by two plates 32 fixed on respective faces of the door or panel and being of generally L-shaped section or having inwardly directed flanges 34 facing each other and delimiting between them a longitudinal slot or passage 36 through which the shoe 24 of the gasket 14 projects with a small amount of clearance.

The cover or sheath 30 may have any appropriate form or structure providing it constitutes a solid protective wall that overlies the inflatable tubular portion of the gasket 14 and that leaves a longitudinal slot or passage through which the shoe 24 of the gasket passes, which slot is narrower than the gasket to avoid the gasket being dismounted or torn off.

The inside volume delimited by the cover or sheath 30 is sufficient to avoid impeding expansion of the gasket when inflated and the corresponding displacement of the shoe 24 towards the fixed surface 12. In other words, the elastically deformable wall 18 of the gasket is free to move inside the cover between its rest position as shown in the drawings and a working position that corresponds to the gasket being inflated.

The height or size of the shoe 24 parallel to its displacement direction may be relatively large, and it is determined as a function of the distance between the flanges 34 of the cover 30 and the fixed surface 12 when in the position shown in FIGS. 1 and 2.

Any appropriate means may be used for fixing the base 16 of the gasket on the periphery of the door or panel 10, providing they are protected and not accessible from the outside. For example, as shown in FIG. 1, the base 16 may have two flanges that point towards each other and that engage a plate 40 which is secured to the frame or structure of the door or panel.

The gasket may also be glued to the periphery of the door or panel.

It will easily be understood that the gasket housed in this way inside the cover or sheath 30 is protected against acts of vandalism since only the shoe 24 is accessible from the outside. The very small clearance between the shoe 24 and the edges of the slot 36 prevent the inflatable gasket 14 being reached from the outside. The internal partition 26 inside the gasket 14 ensures that the shoe 24 is returned to its rest position in spite of any friction that may exist between the shoe 24 and the edges of the slot 36.

I claim:

1. An inflatable gasket sealing device for a moving panel which is movable relative to a fixed surface, the device comprising an inflatable tubular gasket which is mounted on the panel and a shoe for pressing against the fixed surface, a solid wall which is secured to the panel and covers the inflatable tubular gasket and which includes a longitudinal slot through which the shoe passes, said slot being narrower than the inflatable gasket and slightly wider than the shoe, said inflatable tubular gasket comprising a base secured to the moving panel and an elastically deformable wall which connects the base of the gasket to the shoe and is movable between a rest position where said elastically deformable wall is at a distance from said slot in the solid wall and said shoe is at a distance from the fixed surface, the tubular gasket being not inflated, and a working position where said elastically deformable wall is pressed against said solid wall and said shoe is pressed against the fixed surface, the tubular gasket being inflated, said tubular gasket further comprising a longitudinal internal partition which connects the said shoe to the base of the tubular gasket and constitutes means for returning the shoe to the rest position when the tubular gasket is deflated.

2. A device according to claim 1 wherein said internal partition includes through holes.

3. A device according to claim 1, wherein a cover is fixed to the moving panel for constituting said solid wall and the inflatable tubular gasket is housed inside this cover.

4. A device according to claim 1, wherein said solid wall comprises two L-section plates secured to the moving panel and facing each other for delimiting said slot.

* * * * *